US006820180B2

(12) United States Patent
McBrearty et al.

(10) Patent No.: US 6,820,180 B2
(45) Date of Patent: Nov. 16, 2004

(54) APPARATUS AND METHOD OF CASCADING BACKUP LOGICAL VOLUME MIRRORS

(75) Inventors: Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 10/116,518

(22) Filed: Apr. 4, 2002

(65) Prior Publication Data

US 2003/0191916 A1 Oct. 9, 2003

(51) Int. Cl.[7] ......................... G06F 12/16; G06F 12/00; G06F 12/08

(52) U.S. Cl. ......................... 711/162; 711/114; 711/161

(58) Field of Search ................................ 711/162, 161, 711/114

(56) References Cited

U.S. PATENT DOCUMENTS

| | | | |
|---|---|---|---|
| 6,182,198 B1 * | 1/2001 | Hubis et al. ................ | 711/162 |
| 6,216,211 B1 | 4/2001 | McBrearty et al. ......... | 711/162 |
| 2003/0126107 A1 * | 7/2003 | Yamagami ..................... | 707/1 |

* cited by examiner

*Primary Examiner*—Nano Padmanabhan
*Assistant Examiner*—Midys Inoa
(74) *Attorney, Agent, or Firm*—Volel Emile; Mark E. McBurney

(57) ABSTRACT

A method, system and apparatus for cascading backup mirrors are provided. A mirroring map is created. The mirroring map includes at least three mirrors. A first mirror of the three mirrors is set to synchronize to a second mirror and a third mirror is set to synchronize to the first mirror. The first and the third mirror are backup mirrors and the second mirror is a working mirror. One of the backup mirrors is located remotely and the other locally.

12 Claims, 16 Drawing Sheets

| LAST SYNC TIME | DATA IN PSS-1 MODIFIED | MODIFICATION TIME | SYNC TIME |
|---|---|---|---|
| 5:00 AM | A | 5:15 AM | 1:00 AM |
| | B | 5:45 AM | 2:00 AM |
| | | | 3:00 AM |
| | | | 4:00 AM |
| | | | 5:00 AM |
| | | | 6:00 AM |
| | | | 7:00 AM |
| | | | 8:00 AM |
| | | | 9:00 AM |
| | | | 10:00 AM |
| | | | 11:00 AM |
| | | | 12:00 AM |
| | | | 1:00 PM |
| | | | 2:00 PM |
| | | | 3:00 PM |
| | | | 4:00 PM |
| | | | 5:00 PM |
| | | | ⋮ |

| NEW AND MODIFIED DATA IN PSS-2 | MODIFICATION TIME |
|---|---|
| B | 11:10 AM |
| C | 11:30 AM |

FIG. 7

| NEW AND MODIFIED DATA IN PSS-3 | MODIFICATION TIME | SYNC TIME |
|---|---|---|
| A | 11:00 AM | 1:00 AM |
| B | 11:00 AM | |

FIG. 8

APPARATUS AND METHOD OF CASCADING BACKUP LOGICAL VOLUME MIRRORS

CROSS-REFERENCE TO RELATED APPLICATIONS

This application is related to co-pending U.S. patent application Ser. No. 10/116,520, entitled APPARATUS AND METHOD OF MAINTAINING RELIABLE OFFLINE MIRROR COPIES IN VIRTUAL VOLUME GROUPS, filed on even date herewith and assigned to the common assignee of this application.

BACKGROUND OF THE INVENTION

1. Technical Field

The present invention is directed to a method and apparatus for managing data storage systems. More specifically, the present invention is directed to a method and apparatus for cascading logical volume mirrors.

2. Description of Related Art

Most computer systems are made up of at least one processor and one physical storage system. The processor processes, stores and retrieves data from the physical storage system under the guidance of an application program.

Application programs generally run atop an operating system. Among the many tasks of an operating system is that of allowing an application program to have a rather simplistic view of how data (i.e., data files) are stored within a physical storage system. Typically, an application program views the physical storage system as containing a number of hierarchical partitions (i.e., directories) within which entire data files are stored. This simplistic view is often referred to as a logical view since most files are not really stored as unit bodies into directories but rather are broken up into data blocks that may be strewn across the entire physical storage system.

The operating system is able to allow an application program to have this simplistic logical view with the help of a file management system. The file management system stores directory structures, breaks up data files into their constituent data blocks, stores the data blocks throughout a physical storage system and maintains data logs of where every piece of data is stored. Thus, the file management system is consulted whenever data files are being stored or retrieved from storage.

Computer systems that have a plurality of physical storage systems (e.g., servers) use an added layer of abstraction when storing and retrieving data. The added layer of abstraction is a logical volume manager (LVM). Volume, in this case, is the storage capacity of a physical storage system. Thus, volume and physical storage system will henceforth be used interchangeably.

The LVM arranges the physical storage systems into volume groups in order to give the impression that storage systems having each a much more voluminous storage capacity are being used. Within each volume group, one or more logical volumes may be defined. Data stored in a logical volume appears to be stored contiguously. However in actuality, the data may be interspersed into many different locations across all the physical storage systems that make up the volume group.

Stated differently, each logical volume in a logical volume group is divided into logical partitions. Likewise, each physical volume in a physical volume group is divided into physical partitions. Each logical partition corresponds to at least one physical partition. But, although the logical partitions in a logical volume are numbered consecutively or appear to be contiguous to each other, the physical partitions to which they each correspond, need not be contiguous to each other. And indeed, most often, the physical partitions are not contiguous to each other. Thus, one of the many tasks of the LVM is to keep tab on the location of each physical partition that corresponds to a logical partition.

For fault tolerance and performance, some servers store at least one extra copy of each piece of data onto the physical storage systems they use. Storing more than one copy of a piece of data is called mirroring the data. In order to store mirrored data, each logical partition used must correspond to as many physical partitions as there are mirrors (or copies) of the data. In other words, if the data is mirrored three times, for example, each logical partition will correspond to three physical partitions.

Writing data in mirrors is quite a time-consuming and CPU-intensive endeavor. Thus when there is more than two mirrors, some system administrators sometimes designate one of the mirrors as a backup mirror and the others as working mirrors. As alluded to above, data is usually written concurrently into all the working mirrors. However, updates are made to the backup mirror periodically (e.g., once a day). One mirror is usually designated as the mirror that will provide the updates. Using data from a working mirror to update a backup mirror is referred to as synchronizing the backup mirror to the designated working mirror.

For disaster recovery, some computer systems may have another mirror located at a remote location. This mirror may also be designated as another backup mirror. It should be noted however, that during the time a backup mirror is being synchronized with a working mirror, no application programs may have access to any of the working mirrors. Therefore, it may not be practical to synchronize a remote backup mirror with a working mirror.

Thus, what is needed is an apparatus and method of synchronizing one backup mirror to another backup mirror.

SUMMARY OF THE INVENTION

The present invention provides a method, system and apparatus for cascading backup mirrors. A mirroring map is created. The mirroring map includes at least three mirrors. A first mirror of the three mirrors is set to synchronize to a second mirror and a third mirror is set to synchronize to the first mirror. The first and the third mirror are backup mirrors and the second mirror is a working mirror. One of the backup mirrors is located remotely and the other locally.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 illustrates a second modification table that may be used with the invention.

FIG. 8 illustrates a third modification table that may be used with the invention.

DETAILED DESCRIPTION OF THE PREFERRED EMBODIMENTS

Figure 1:
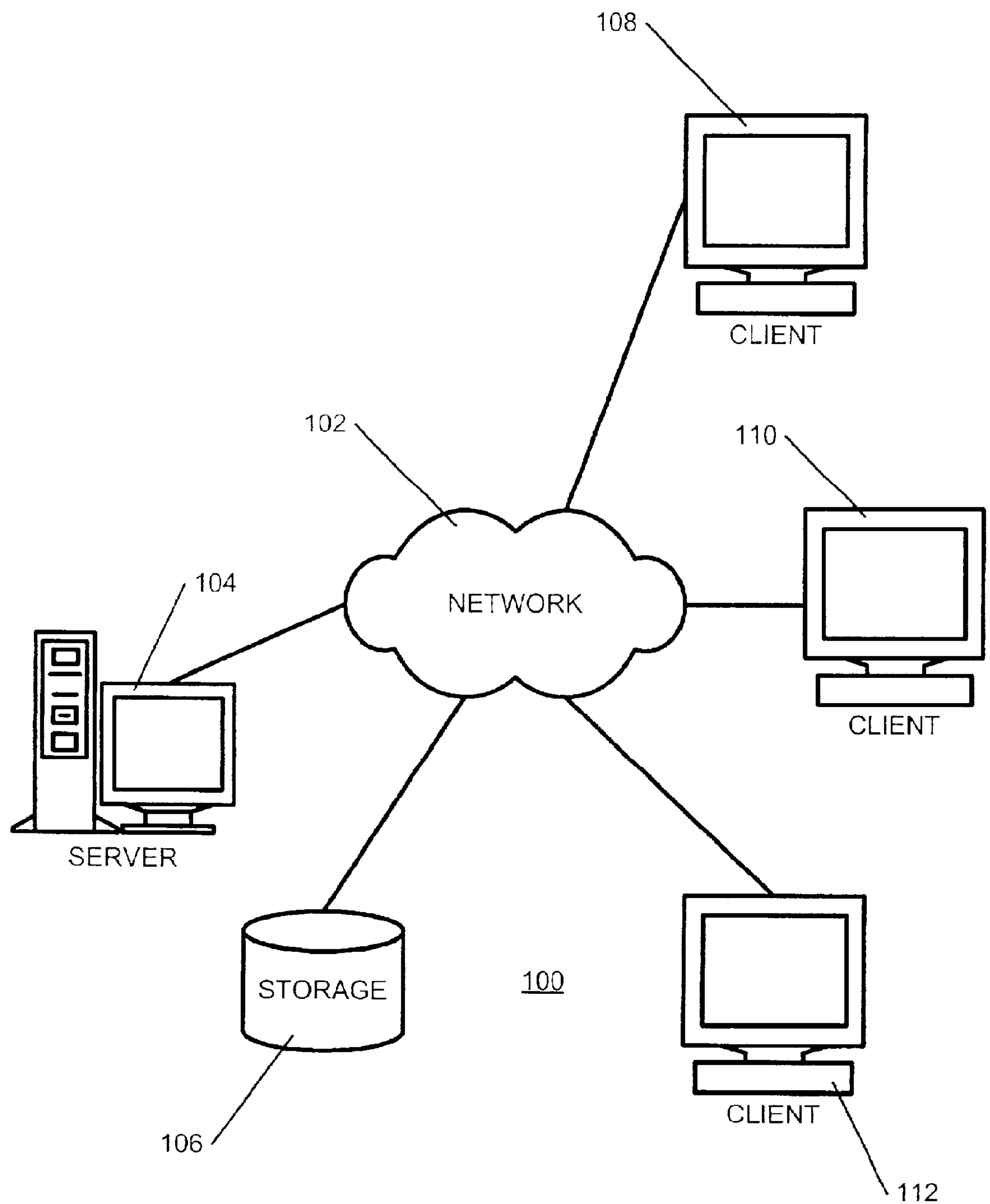
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
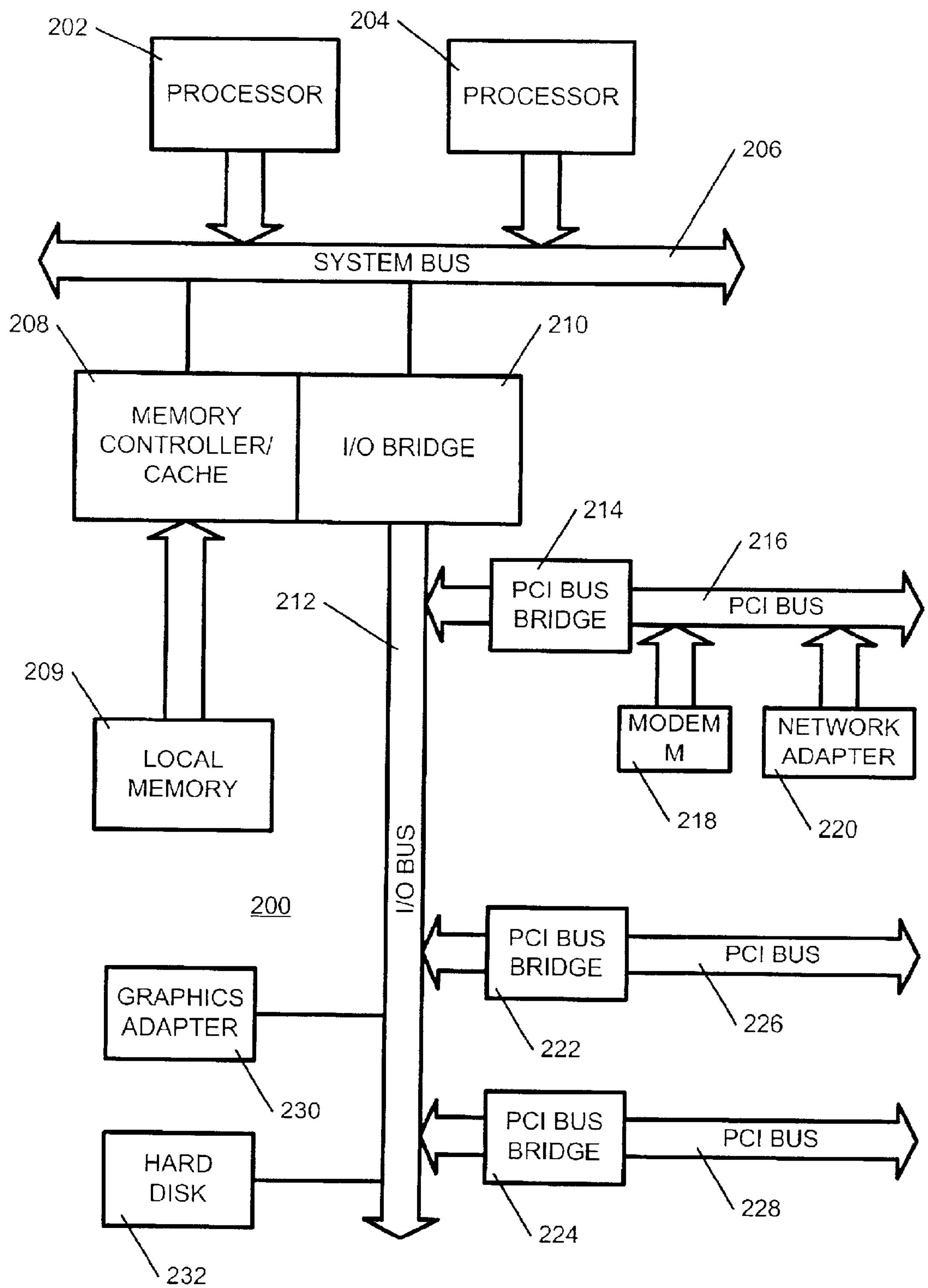
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
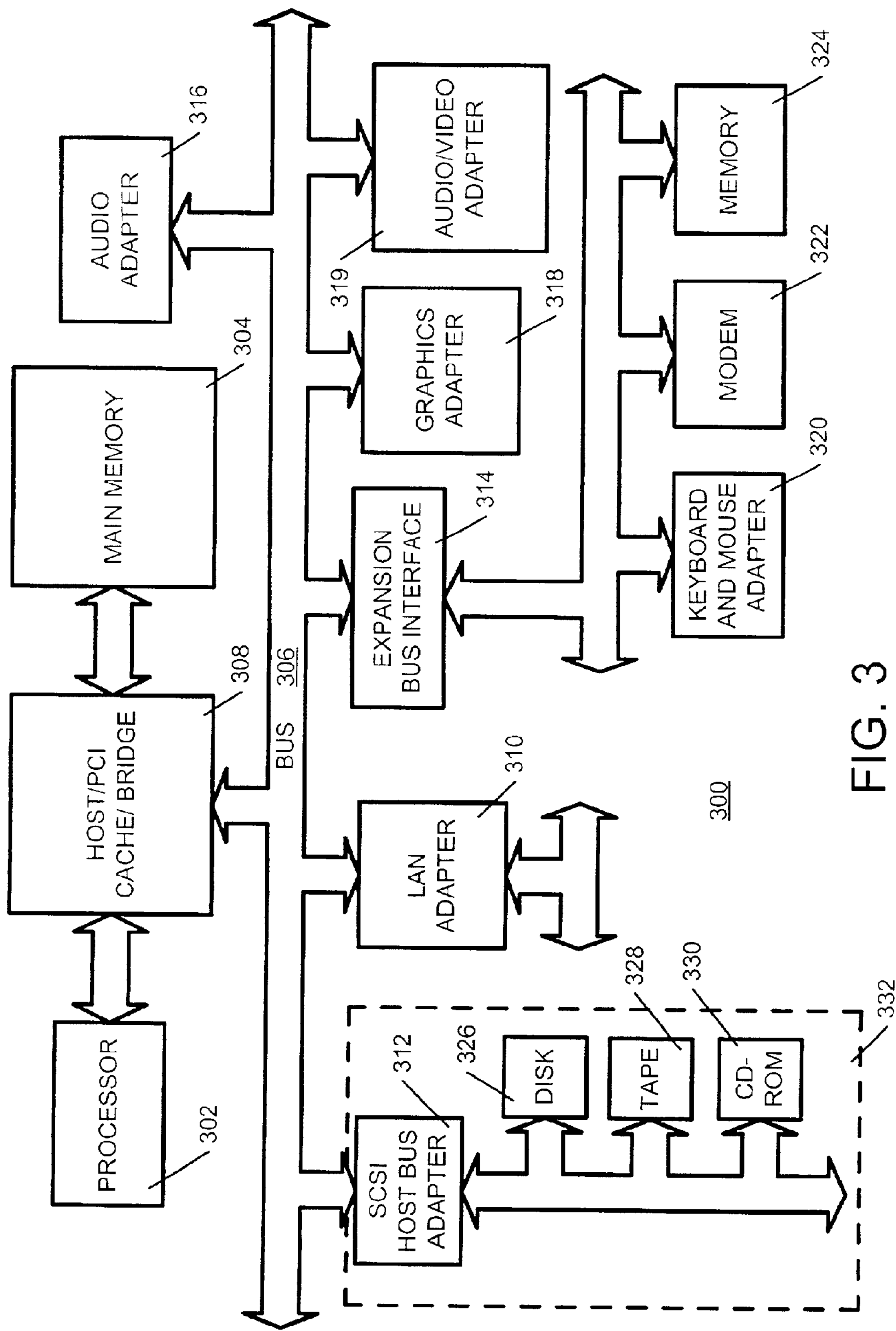
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of synchronizing one backup mirror to another backup mirror. Although the invention may preferably be local to server 104, it may nonetheless, be local to client systems 108, 110 and 112 of FIG. 1 or to both the server 104 and clients 108, 110 and 112. Consequently, the present invention may reside on any data storage medium (i.e., floppy disk, compact disk, hard disk, ROM, RAM, etc.) used by a computer system.

Figure 4:
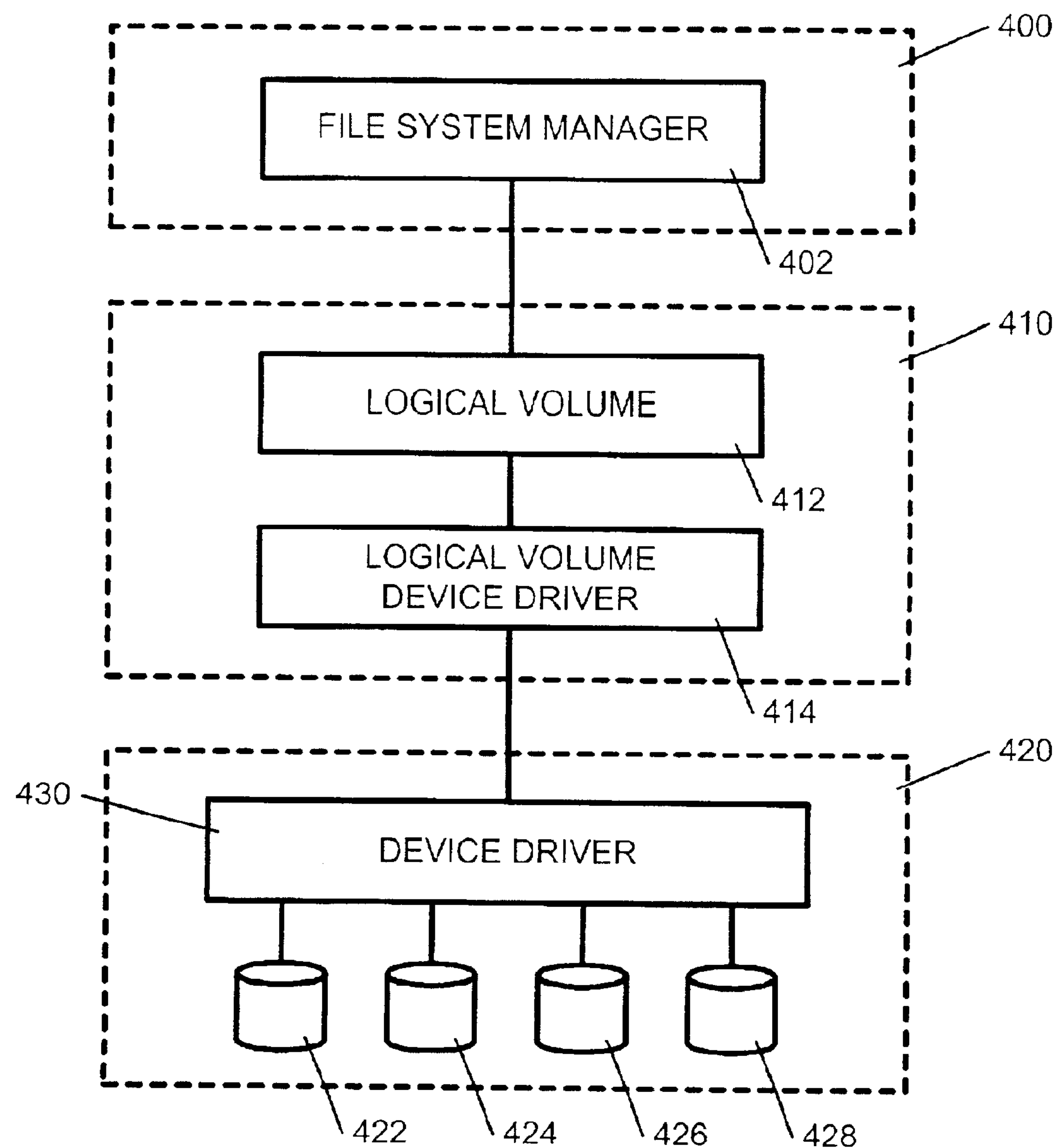
FIG. 4 is a conceptual view of an LVM.

To better understand the invention, a more detailed explanation of the LVM is needed. The LVM interacts with application programs and the physical storage devices as shown in FIG. 4. In FIG. 4 three layers are depicted, an application layer 400, a logical layer 410 and a physical layer 420 each having one or more devices. It should be noted that the devices shown in the three layers are not all-inclusive. There may be more devices in use in each of the application layer 412, the logical layer 410 and the physical layer 430. Thus, the devices in FIG. 4 should be taken only as an example of devices that may be used.

The logical layer 410, for all intent and purpose, is the LVM. The LVM may be regarded as being made up of a set of operating system commands, library subroutines or other tools that allow a user to establish and control logical volume storage. The LVM controls physical storage system resources by mapping data between a simple and flexible logical view of storage space and the actual physical storage system. The LVM does this by using a layer of device driver code that runs above traditional device drivers. This logical view of the disk storage is provided to application programs and is independent of the underlying physical disk structure.

The logical layer 410 contains a logical volume 412 that interacts with logical volume device driver 414. A device driver, as is well known in the art, acts as a translator between a device and programs that use the device. That is, the device driver accepts generic commands from programs and translates them into specialized commands for the device. In this case, the logical volume device driver 414 translates commands from an application program that may be executing on the computer system for device driver 430. Thus, when an application program sends commands to file system manager 402 to store or retrieve data from logical volume 412, the file system manager 402 informs the logical volume manager 412 of the application program's wish. The logical volume manager 412 then conveys the wish to the logical volume device driver 414. The logical volume device driver 414 then consults the appropriate map and instructs the device driver 430 which ones of physical storage systems 422, 424, 426 and 428 to use for the data.

When a system administrator wants to mirror a piece of data, the administrator has to devise a map (or mirroring scheme) to correlate the logical volume being used to the actual physical storage systems in which the data is to be stored. Generally, this map correlates the logical partitions to the physical partitions of the physical storage systems that are to be used. This map is stored in the LVM.

Figure 5:
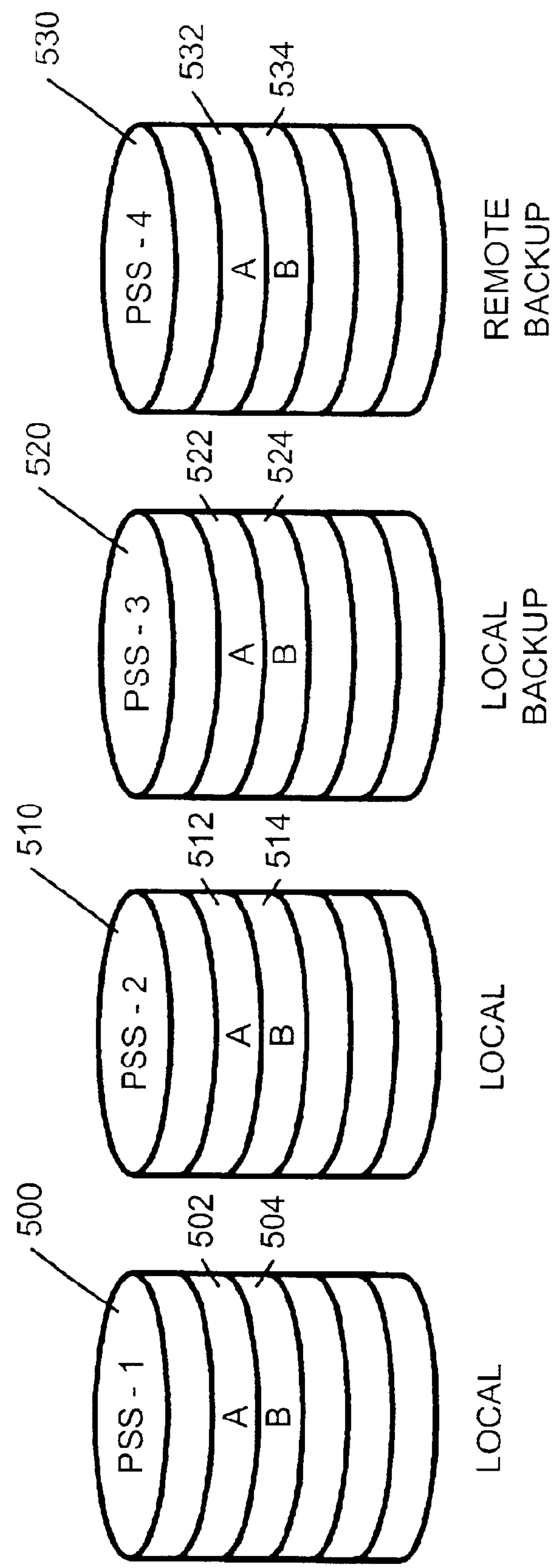
FIG. 5 illustrates a mirroring map that may be used with the present invention.

FIG. 5 illustrates an example of a mirroring map that may be stored in the LVM. In this example, four physical storage systems (PSS) are used. The physical storage systems are PSS-1 500, PSS-2 510, PSS-3 520 and PSS-4 530. The four physical storage systems are divided into partitions (see partitions 502, 504 and 506 of PSS-1 500, partitions 512, 514 and 516 of PSS-2 510, partitions 522, 524 and 526 of PSS-3 520 and partitions 532 and 534 of PSS-4 530). Mirrored data is stored in the three physical storage systems as illustrated by data A in partitions 502 and 512 of PSS-1 500 and PSS-2 510. PSS-1 500 and PSS-2 510 are local working mirrors. PSS-3 520 is a local backup mirror and PSS-4 530 is a remote backup mirror.

When the computer system effectuates a write operation into PSS-1 500, a write operation is also effectuated into PSS-2 510 and vice versa and the data is written into appropriate locations as per the mirroring map. However, a write operation is not performed into PSS-3 520 and PSS-4 530. Instead, a table of modifications is updated in the LVM. This table is consulted periodically. Specifically, the table is consulted before PSS-520 is to be synchronized to a designated local working mirror (i.e., either PSS-1 500 or PSS-2 510) to determine which pieces of data are to be written into PSS-3 520 to perform the synchronization.

Figure 6:
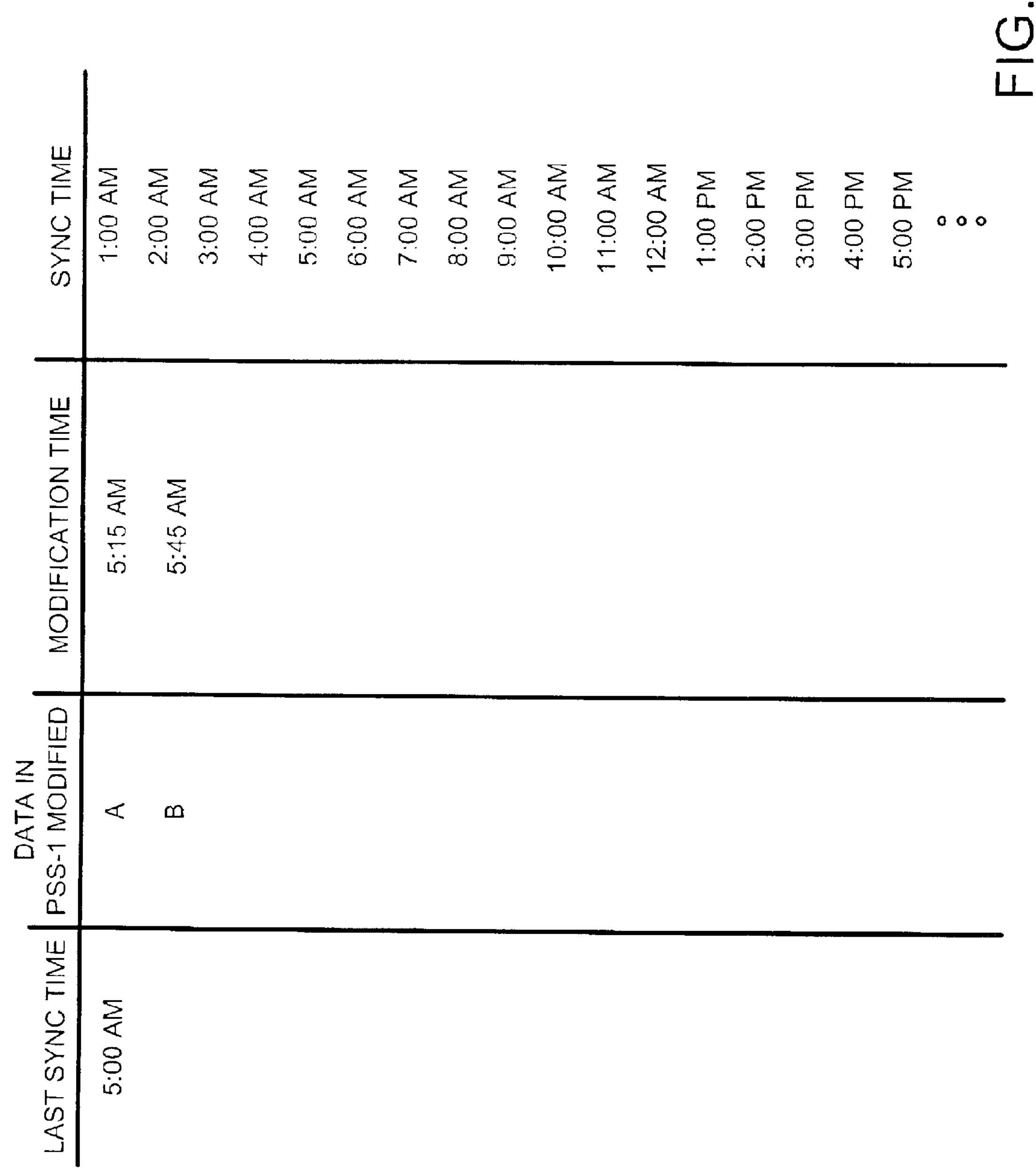
FIG. 6 illustrates a first modification table that may be used with the present invention.

FIG. 6 illustrates a modification table that may be used by the present invention. Based on the table, PSS-3 520 (see FIG. 5) is to be synchronized to PSS-1 500 at every hour on the hour. The last time PSS-3 520 was synchronized to PSS-1 500 was at 5:00 AM. Since the synchronization, data A 502 was modified at 5:15 AM and new data B 504 was written into PSS-1 500 at 5:45 AM, at 6:00 AM, modified data A 502 as well as new data B 504 will be written into PSS-3 520 as data A 522 and new data B 524. Note that if since the last synchronization no modified data or new data was written in PSS-1 500 (i.e., no new entries in the modification table), then no data will be sent to PSS-3 520 at the scheduled time of synchronization, since the PSS-1 500 and PSS-3 520 are already synchronized. Note also that PSS-1 500 is used as the physical volume to which PSS-3 520 is synchronized; however, PSS-3 520 may instead be synchronized to PSS-2 510 since data written in PSS-1 500 is concurrently modified in PSS-2 510 as per the mirroring map. Note further that the synchronizations may occur less often or more often depending on the synchronization time schedule enters in the table. Indeed, most backup mirrors are updated once a day, usually sometime during the night. Thus, the hourly backups are used just for illustration purposes.

As stated in the Background of the Invention, when the working mirrors are being backed up by the local backup mirror (i.e., when PSS-3 520 is being synchronized to PSS-1 500) application programs that are running on the computer system do not have access to the working mirrors (e.g., cannot read or write into either PSS-1 500 or PSS-2 510). Some application programs may have time-sensitive information that may need to be stored or read from the working mirrors. Thus, a method that allows the application programs to have constant access to the data as well as to modify and write new data into the physical systems must be devised.

One way to allow the application programs to continue reading and writing data is to split off the working mirrors. So, just before the time that PSS-3 520 is to be synchronized to PSS-1 500, PSS-1 may be disassociated with PSS-2 510. The application programs will continue to read or write from PSS-2 510 but not from PSS-1 500. After PSS-3 520 is synchronized to PSS-1 500, PSS-1 500 may be re-associated with PSS-2 510.

Ordinarily, when the two working mirrors are disassociated, the working mirror to which the backup mirror is to be synchronized will be ported to another computer system. There, the file systems on the mirror will be mounted. To mount a file system is to make the file systems available for use. Once mounted, the synchronization procedure may be initiated. When the file systems are mounted, some data may be written into the mirrors. The written data may be metadata such as date and time the file systems were mounted etc. Any data written into the mirror should be marked stale before re-associating the mirrors together. Upon re-association, all data marked stale will be discarded.

As mentioned before, during disassociation new data may have been written into PSS-2 510 or existing data in PSS-2 510 may have been modified. Thus upon re-association, PSS-1 500 will not be a true mirror of PSS-2 510. To ascertain that PSS-1 500 remains a true mirror of PSS-2 510 after re-association, new data and modified data written into PSS-2 510 when the mirrors were disassociated are entered into a modification table. After re-association, the new data and the modified data are copied from PSS-2 510 into PSS-1 500. When this occurs, PSS-1 500 and PSS-2 510 become true mirrors of each other again.

To disassociate PSS-1 500 from PSS-2 510 the mapping mirror must be modified. That is, partitions from the logical volume that originally correspond to physical partitions in both PSS-1 500 and PSS-2 510 will only correspond to only partitions in PSS-2 510. After re-association, the mapping mirror may be modified once more to correlate each partition in the logical volume to the physical partitions in both PSS-1 500 and PSS-2 510.

FIG. 7 illustrates a modification table that may be used to record changes in PSS-2 510 while PSS-1 500 and PSS-2 510 are no longer mirrors of each other. It is assumed that at 11:00 PM, PSS-1 500 is disassociated from PSS-2 510 for backup purposes and at 12:00 AM it is re-associated with PSS-2 510. Between 11:00 PM and 12:00 AM data B in PSS-2 510 is modified and new data C is written into PSS-2 510. When PSS-1 500 is re-associated with PSS-2 510, modified data B and new data C will be copied from PSS-2 510 and written into PSS-1 500. At that point, PSS-1 500 and PSS-2 510 are again mirrors of each other. From that point forward data written in PSS-1 500 will concurrently be written into PSS-2 510 and vice versa until they are disassociated from each other again for backup purposes.

FIG. 8 is another modification table that may be used with the invention. In this modification table, the time that a piece of data was modified as well as the time that a new piece of data was written into the local backup mirror (i.e., PSS-3 520) including the data itself are noted. To better understand the invention, FIG. 8 should be used in conjunction with FIG. 7. In FIG. 7, let us suppose that PSS-3 520 was synchronized with PSS-1 500 at 11:00 PM. Thus, the modification time entered for both modified data A and new data B is 11:00 PM. At 1:00 AM, remote backup PSS-4 530 is to be synchronized with local backup PSS-3 520. Thus, modified data A and new data B will be copied into remote backup PSS-4 530

As described, the remote backup mirror is synchronized to the local backup mirror. The invention can therefore be extended to have a second remote or local backup mirror be synchronized to the first remote backup mirror and to have a third remote backup mirror be synchronized to the second remote backup mirror and so on to obtain a cascaded backup mirrors.

Figure 9:
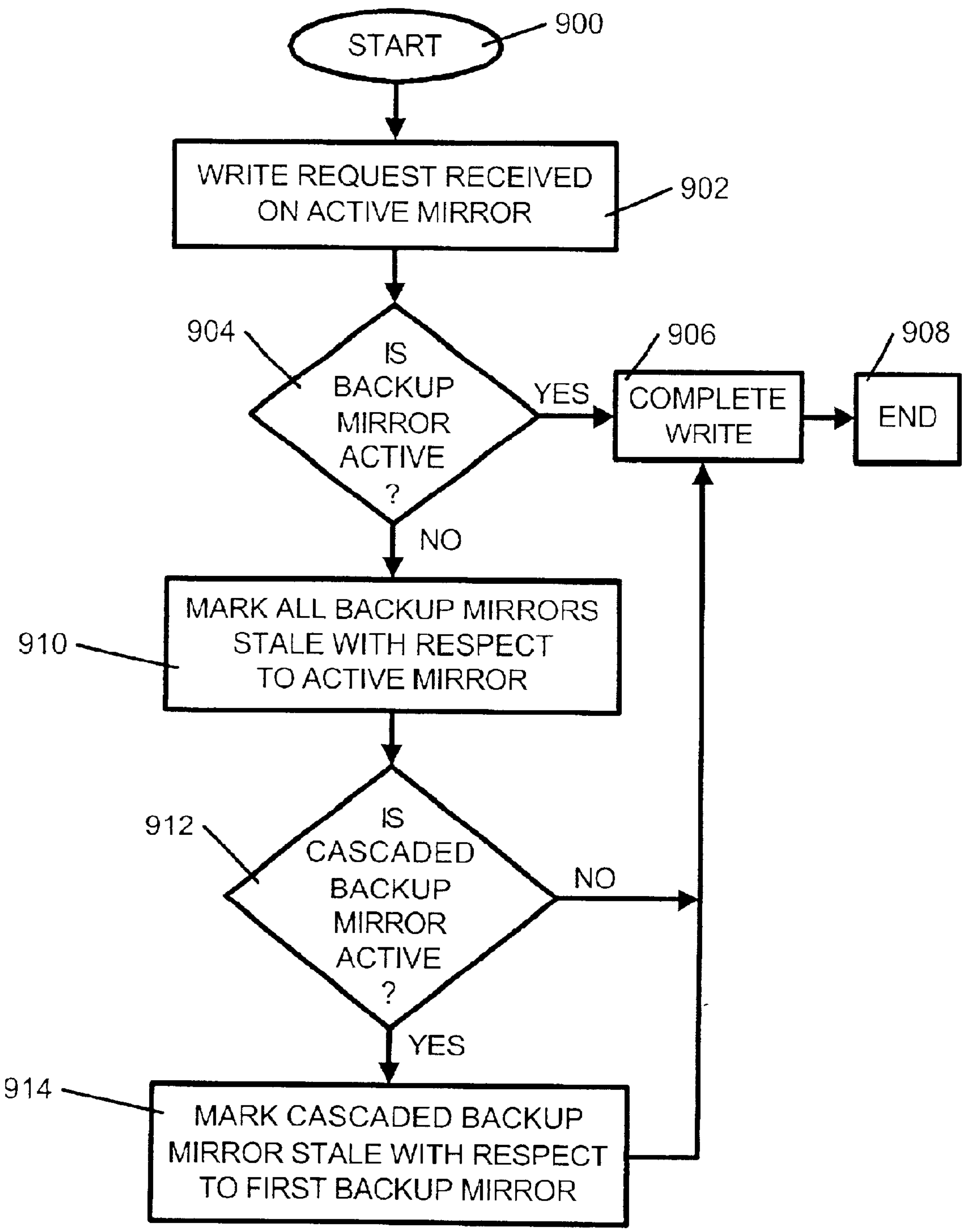
FIG. 9 is a flow chart of a process that may be used by the present invention to write data into an active mirror.

FIG. 9 is a flow chart of a process that may be used by the present invention to write data into an active mirror. The process starts when a request to write data into an active mirror is received. A check is then made to determine whether there are active backup mirrors. If so the data is written into the mirror and the process ends. If there is a backup mirror being active, then all backup mirrors are marked as stale with respect to the active mirror. Then a check is made to determine whether a cascaded backup mirror is active. If not, the data is written into the active mirror and the process ends. If there is a cascaded active backup mirror, it is marked as stale with respect to the first backup mirror before writing the data into the mirror (steps 900–914).

Figure 10:
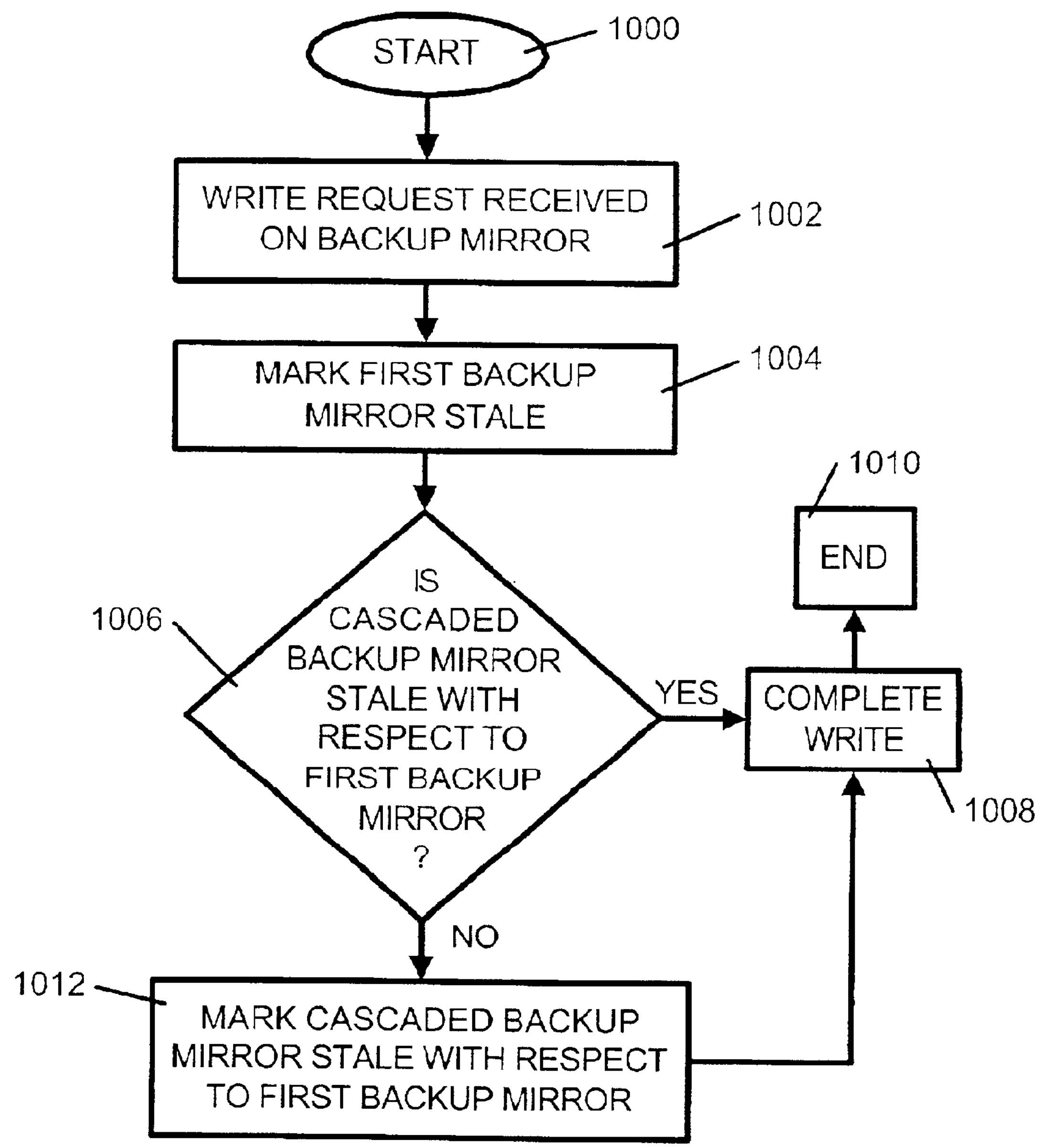
FIG. 10 is a flow chart of a process that may be used by the present invention to write data into a backup mirror.

FIG. 10 is a flow chart of a process that may be used by the present invention to write data into a backup mirror. The process starts when a request to write data onto a backup mirror is received. The first backup mirror is marked as stale and a check is made to determine whether there is a cascaded backup mirror that has been marked as stale with respect to the first backup mirror. If so, the data is written in the backup mirror and the process ends. If not, the cascaded backup mirror is marked as stale with respect to the first backup mirror before writing the data onto the mirror (steps 1000–1012).

Figure 11:
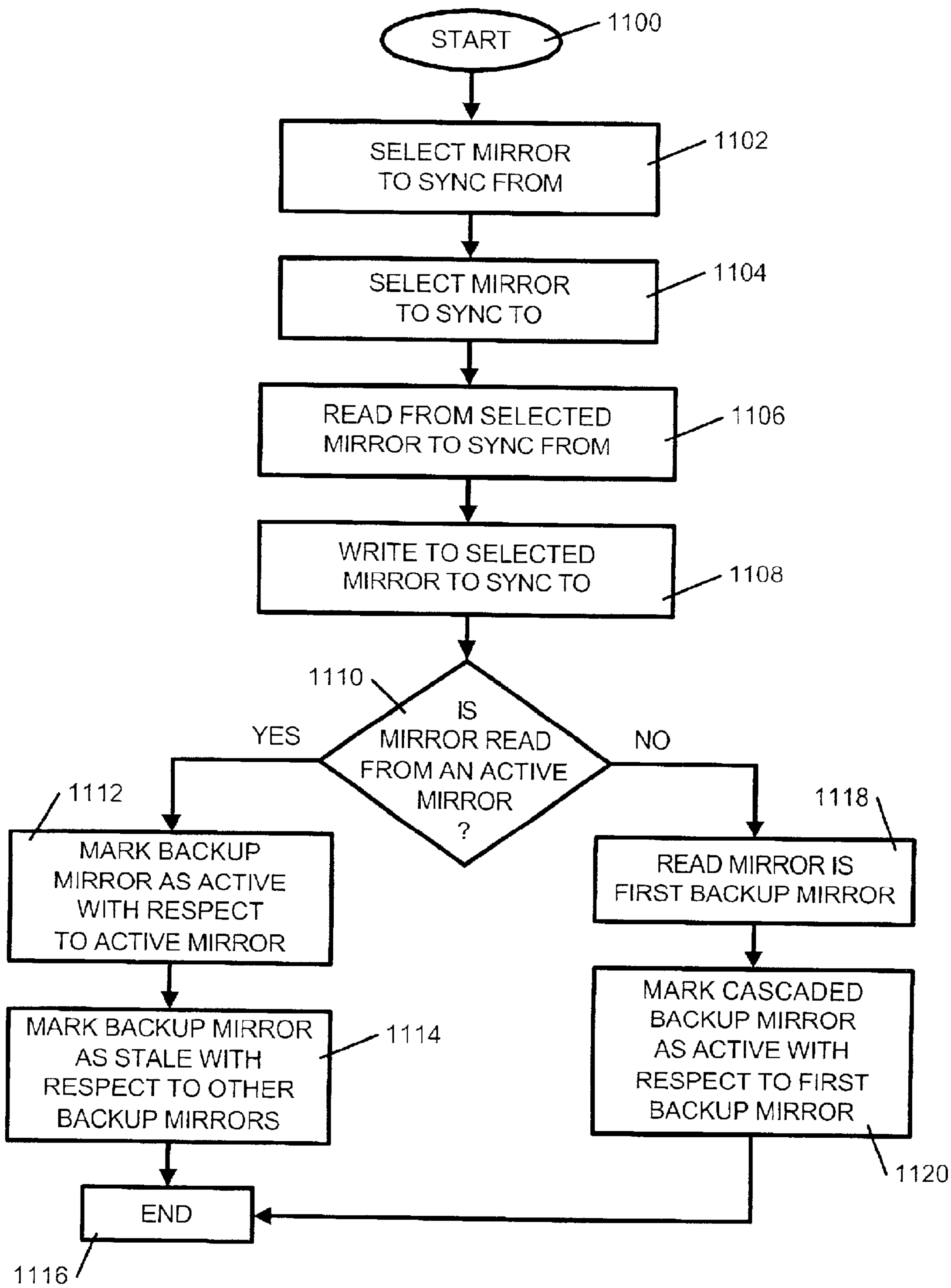
FIG. 11 is a flow chart of a process that may be used by the present invention to synchronize one mirror to another mirror.

FIG. 11 is a flow chart of a process that may be used by the present invention to synchronize one mirror to another mirror. The process starts when a request to synchronize one mirror to another is received. Data is read from the mirror to which the other mirror is to be synchronized and written into the mirror being synchronized. Then a check is made to determine whether the data is read from an active mirror. If so, backup mirrors, if there are any, are marked as active with respect to the active mirror and as stale with respect to cascaded backup mirrors and the process ends. If the data was read from a non-active mirror, then the mirror is a first backup mirror and cascaded backup mirrors are marked as active with respect to first backup mirror and the process ends (steps 1100–1120).

Figure 12:
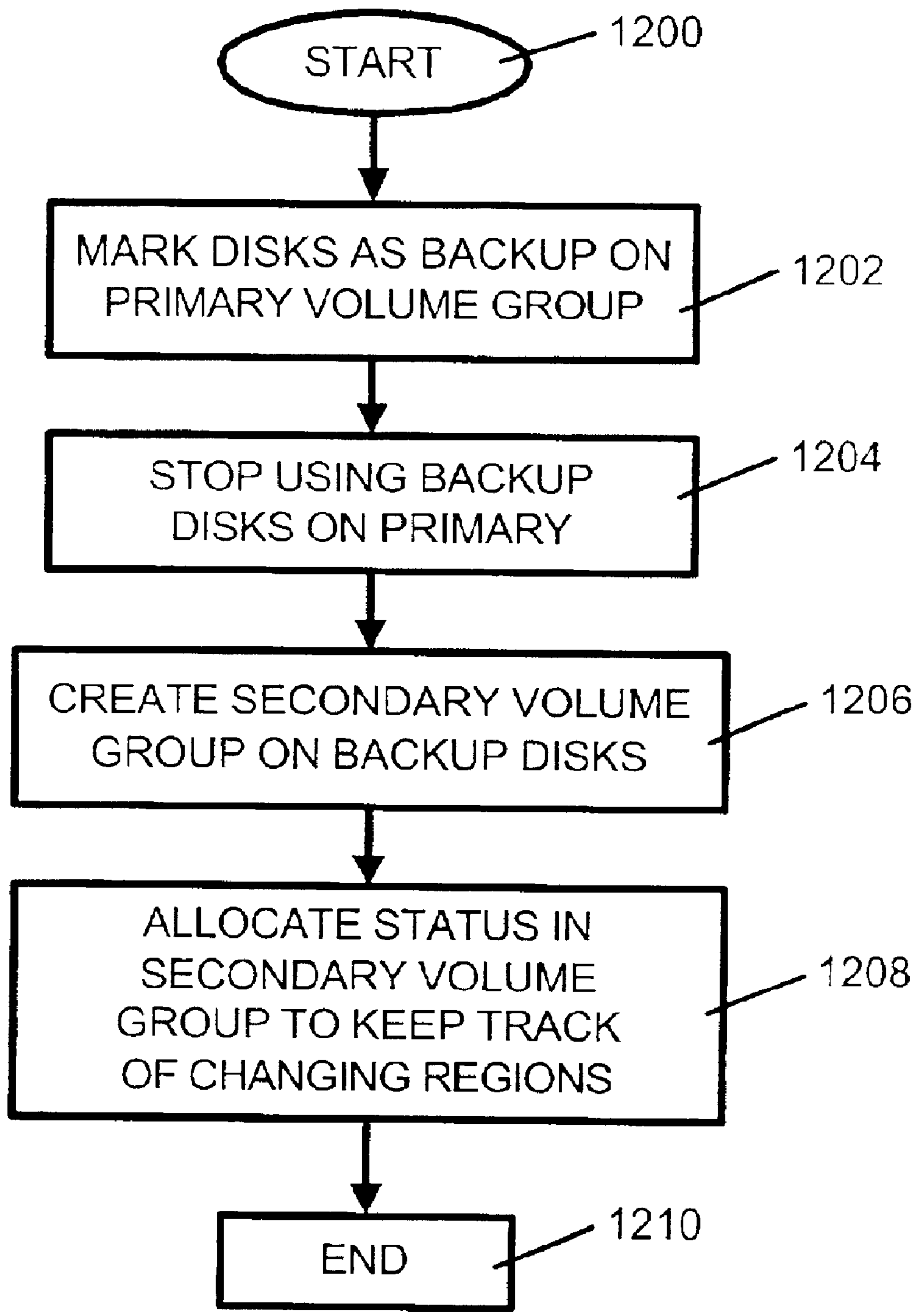
FIG. 12 is a flow chart of a process that may be used by the present invention to disassociate one mirror from another.

FIG. 12 is a flow chart of a process that may be used by the present invention to disassociate one mirror from another. The process starts when a mirror is to be taken offline. All PSSs on primary volume group are marked as backup PSS and are not used anymore. Then, a secondary volume group is created using the backup PSSs (the ones that have just been marked as backup PSSs). Status allocations are made to keep track of regions that may have changed while the PSSs make up the secondary volume group and the process ends (steps 1200–1210).

Figure 13:
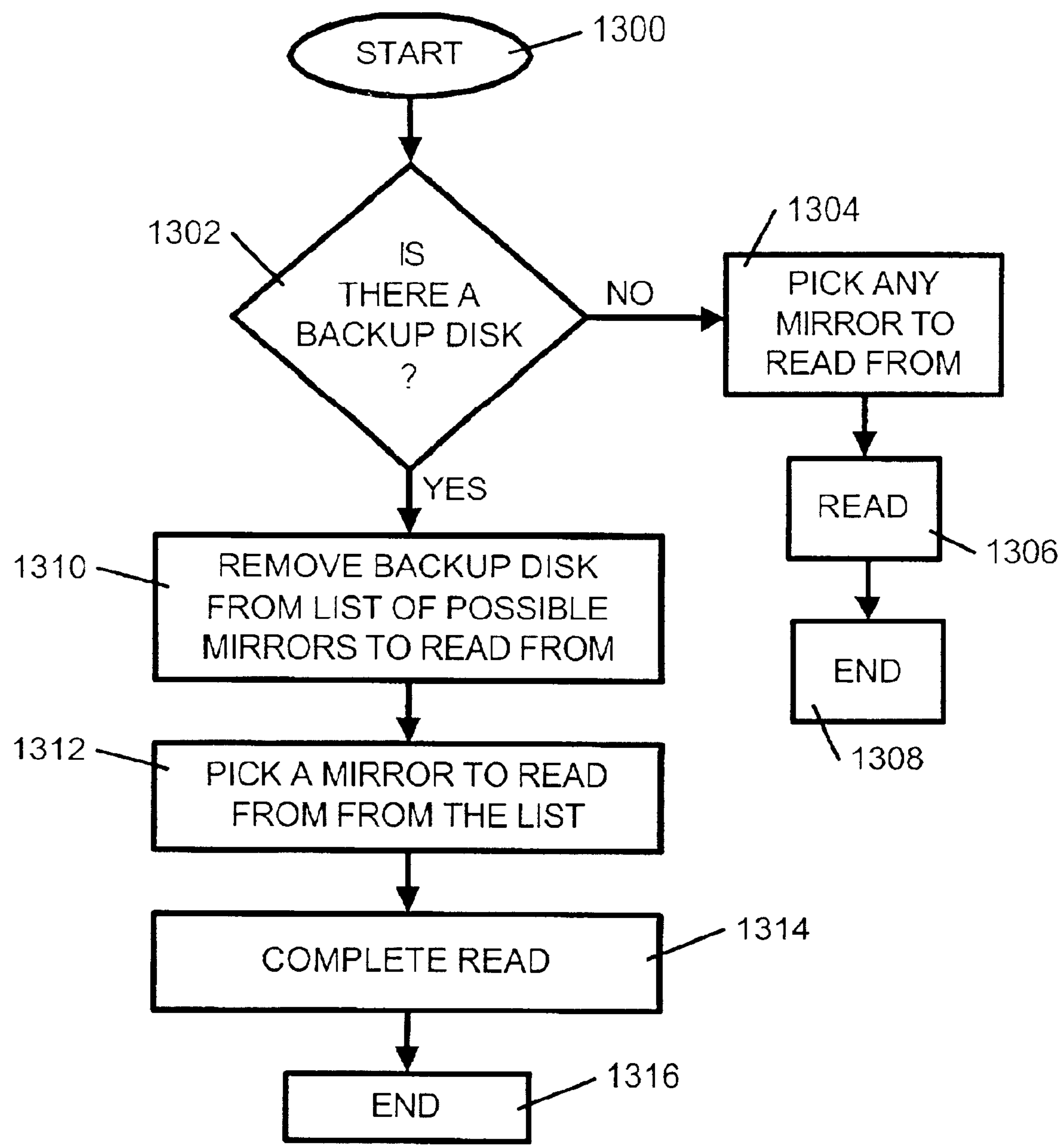
FIG. 13 is a flow chart of a process that may be used by the present invention to read data from a primary volume group when a mirror has been taken offline.

FIG. 13 is a flow chart of a process that may be used by the present invention to read data from a primary volume group when a mirror has been taken offline. The process starts when data is to be read. Then a check is made to determine whether there is a backup disk. If not, any mirror can be chosen from which to read the requested data. If yes, the backup disk is removed from the list of mirrors from which the data can be read. A mirror from which the data is to be read is chosen from the remaining disk. The data is then read and the process ends (steps 1300–1316).

Figure 14:
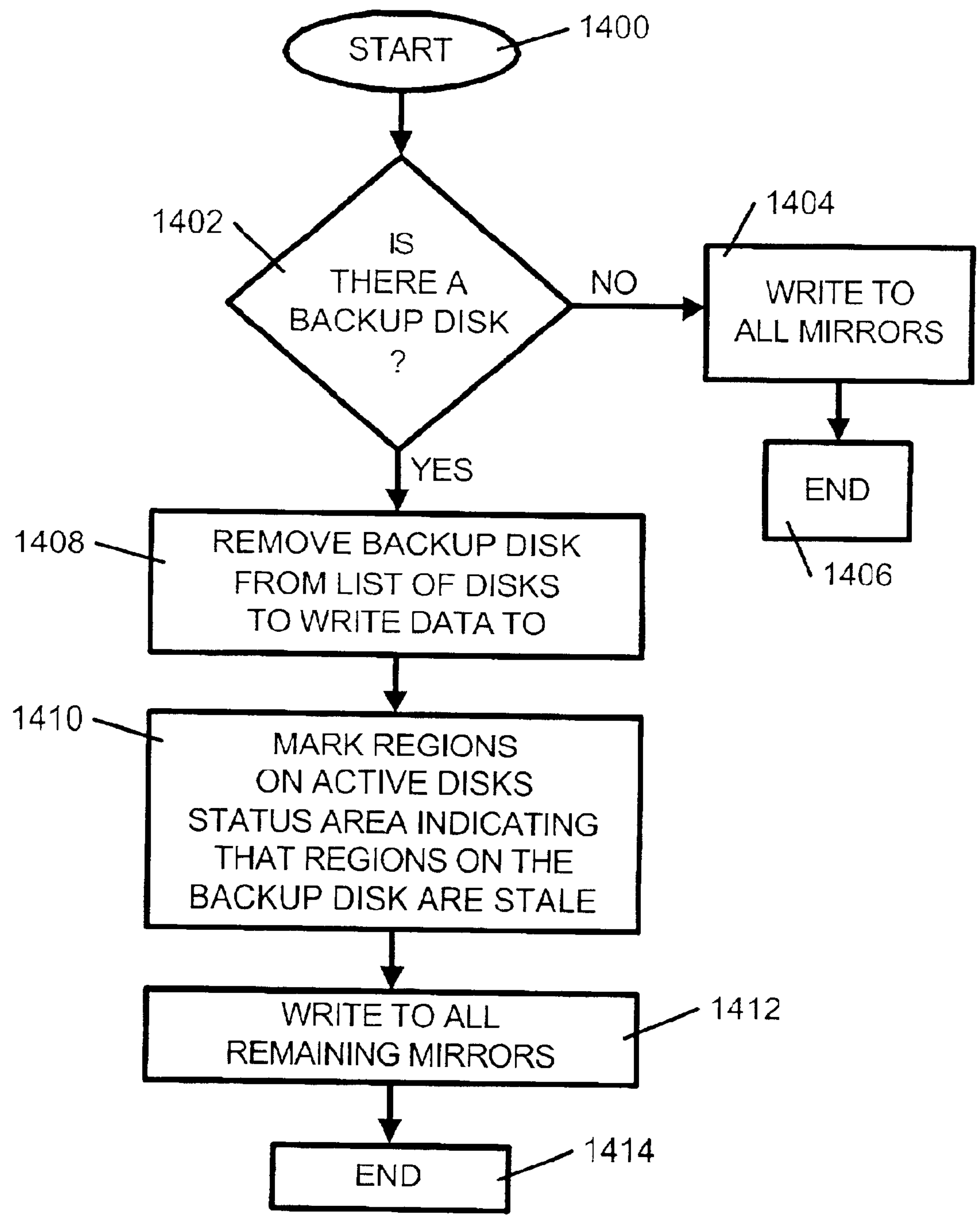
FIG. 14 is a flow chart of a process that may be used by the present invention to write data from a primary volume group when a mirror has been taken offline.

FIG. 14 is a flow chart of a process that may be used by the present invention to write data from a primary volume group when a mirror has been taken offline. The process starts when a request to read data is received. A check is made to determine whether there is a backup mirror. If not, the data is written to all the (active) mirrors and the process ends. If there is a backup mirror, the backup mirror is removed from the list of mirrors that the data is to be written onto. The regions on the active mirrors' status area are flagged to indicate that the corresponding regions on the backup mirror are stale. The data is then written to all the remaining mirrors in the list and the process ends (steps 1400–1414).

Figure 15:
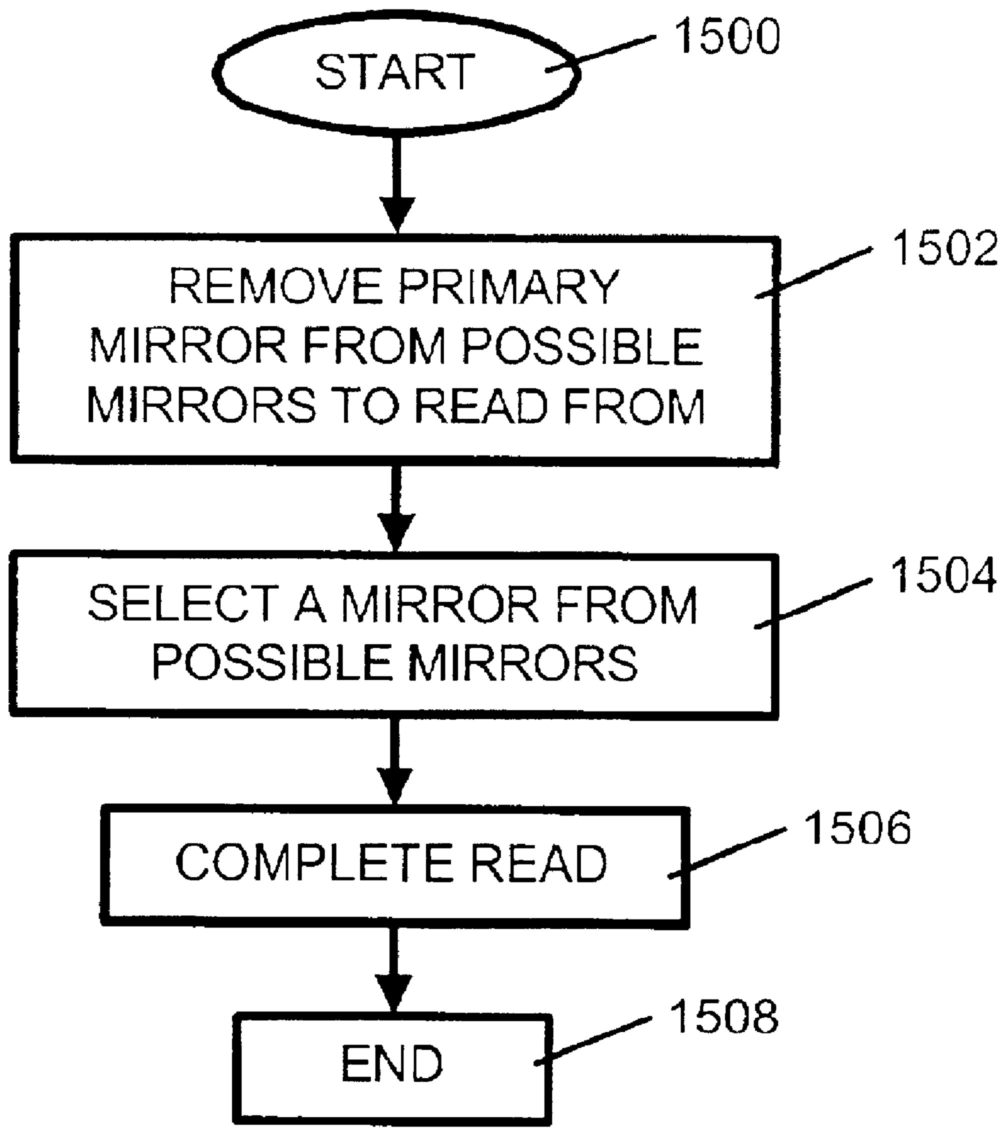
FIG. 15 is a flow chart of a process that may be used by the present invention to read data from a secondary volume group when a mirror has been taken offline.

FIG. 15 is a flow chart of a process that may be used by the present invention to read data from a secondary volume group when a mirror has been taken offline. The process starts when a read request is received to read from a secondary volume group. The primary mirror is removed from the list of possible mirrors to read from. Then a mirror is selected from the remaining mirrors from the list. The read is then effectuated and the process ends (steps 1500–1508).

Figure 16:
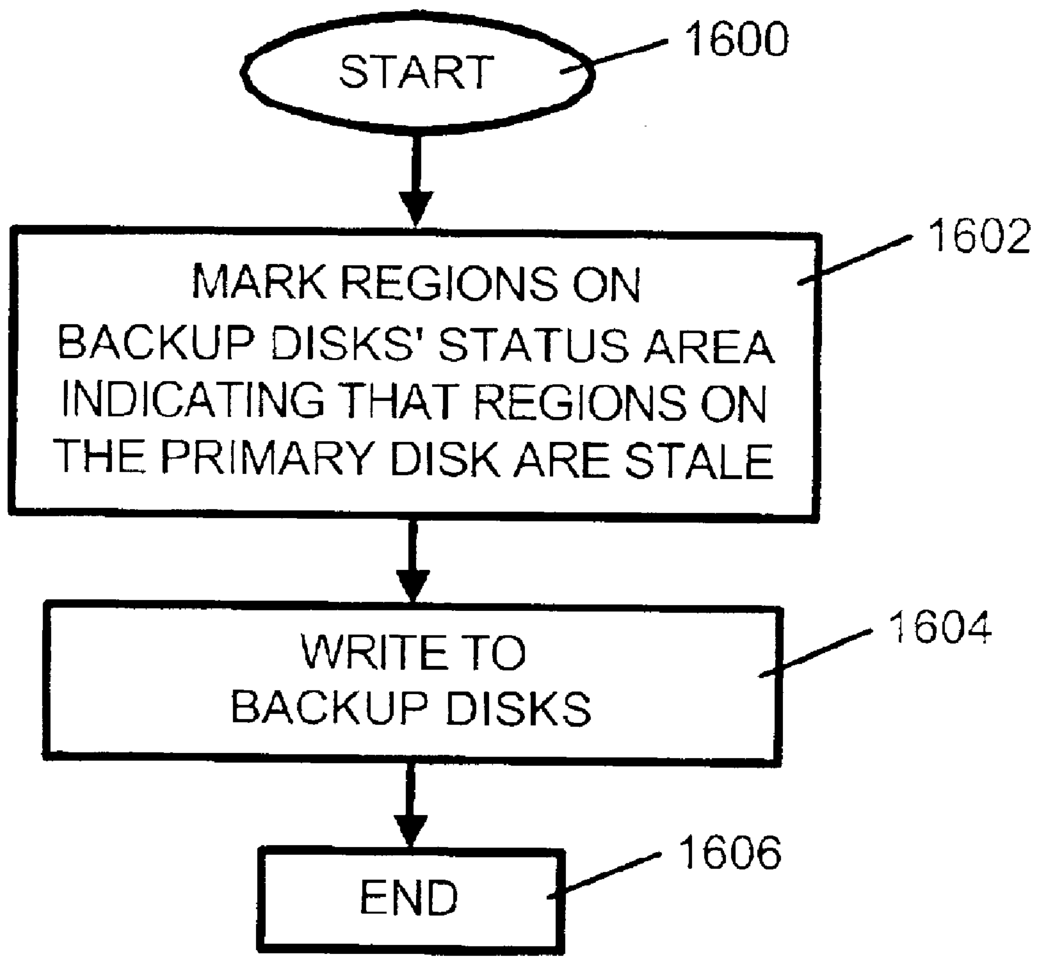
FIG. 16 is a flow chart of a process that may be used by the present invention to write data to a secondary volume group when a mirror has been taken offline.

FIG. 16 is a flow chart of a process that may be used by the present invention to write data to a secondary volume group when a mirror has been taken offline. The process starts when a request to write data to a secondary volume group is received. Flag regions on backup mirrors' status area to indicate that corresponding regions on the primary mirror are stale. The data is then written onto the backup mirror and the process ends (steps 1600–1606).

Figure 17:
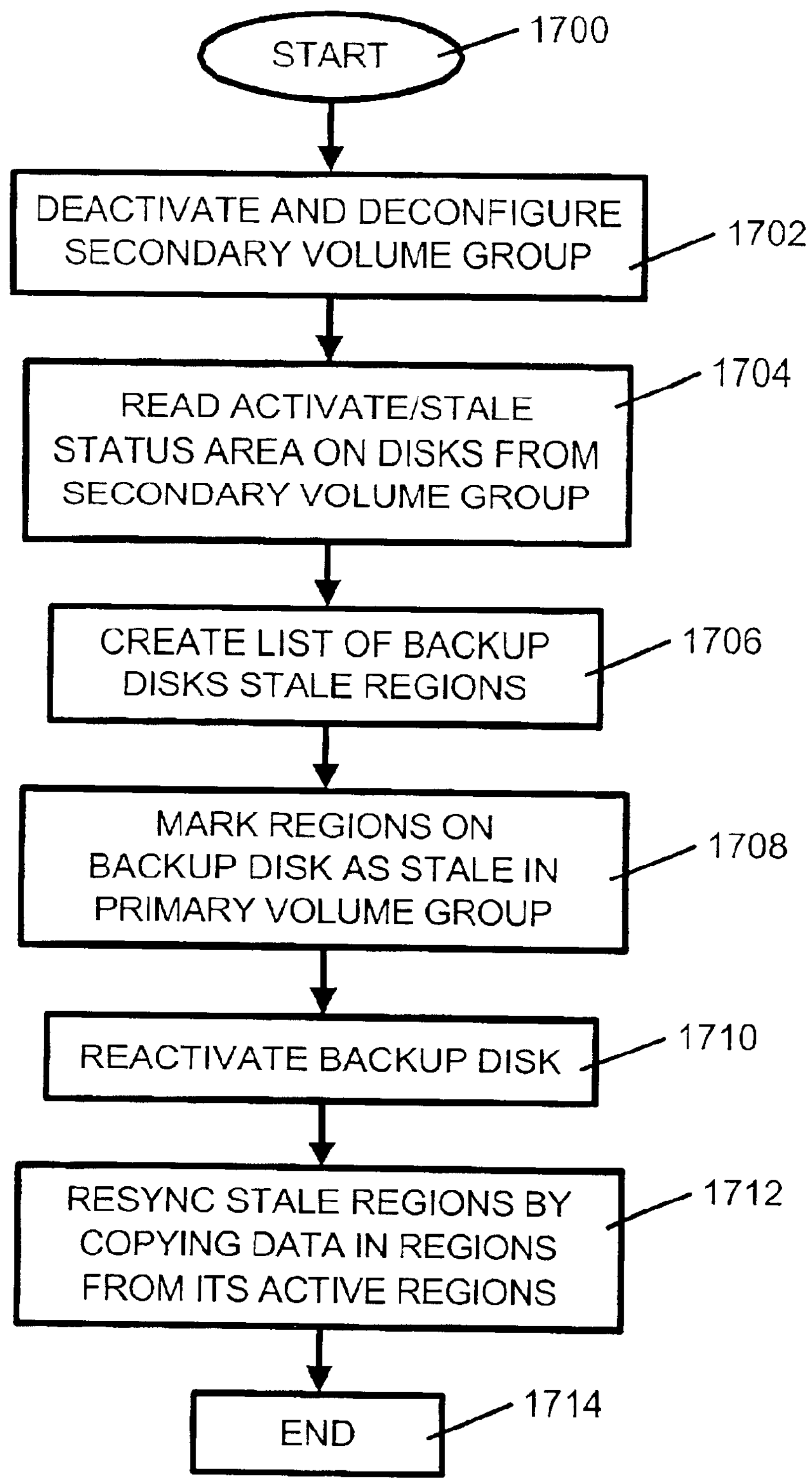
FIG. 17 is a flow chart of a process that may be used by the present invention to rejoin an offline mirror to an active mirror.

FIG. 17 is a flow chart of a process that may be used by the present invention to rejoin an offline mirror to an active mirror. The process starts when an offline mirror is to be re-associated with a working mirror. The secondary volume group, which contains the offline mirror, is deactivated and de-configured. Stale regions of the previously offline mirror are read or activated. A list of the stale regions is created. All corresponding regions in the primary volume group are flagged. The backup mirror is then re-activated. Then the flagged regions are copied into the backup mirror and the process ends (steps 1700–1714).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of cascading backup logical volume mirrors comprising the steps of:

creating a mirroring map, the mirroring map including at least three mirrors, a working mirror and a first and a second backup logical volume mirrors; and setting the first backup logical volume mirror to be synchronized to the working mirror and the second backup logical volume mirror to be synchronized to the first backup logical volume mirror.

2. The method of claim 1 wherein both the working mirror and the first backup logical volume mirror are located locally and the second backup logical volume mirror is located remotely.

3. The method of claim 2 wherein the first and the second backup logical volume mirrors are sychronized and different times.

4. A computer program product on a computer readable medium for cascading backup logical volume mirrors comprising:

code means for creating a mirroring map, the mirroring map including at least three mirrors, a working mirror and a first and a second backup logical volume mirrors; and code means for setting the first backup logical volume mirror to be synchronized to the working mirror and the second backup logical volume mirror to be synchronized to the first backup logical volume mirror.

5. The computer program product of claim 4 wherein both the working mirror and the first backup logical volume mirror are located locally and the second backup logical volume mirror is located remotely.

6. The computer program product of claim 5 wherein the first and the second backup logical volume mirrors are synchronized at different times.

7. An apparatus for cascading backup logical volume mirrors comprising:

means for creating a mirroring map, the mirroring map including at least three mirrors, a working mirror and a first and a second backup logical volume mirrors; and means for setting the first backup logical volume mirror to be synchronized to the working mirror and the second backup logical volume mirror to be synchronized to the first backup logical volume mirror.

8. The apparatus of claim 7 wherein both the working mirror and the first backup logical volume mirror are located locally and the second backup logical volume mirror is located remotely.

9. The apparatus of claim 8 wherein the first and the second backup logical volume mirrors are synchronized at different times.

10. A computer system for cascading backup logical volume mirrors comprising:

at least one storage device for storing code data; and at least one processor for processing the code data to create a mirroring map, the mirroring map including at least three mirrors, a working mirror and a first and a second backup logical volume mirrors, and to set the first backup logical volume mirror to be synchronized to the working mirror and the second backup logical volume mirror to be synchronized to the first backup logical volume mirror.

11. The computer system of claim 10 wherein both the working mirror and the first backup logical volume mirror are located locally and the second backup logical volume mirror is located remotely.

12. The computer system of claim 11 wherein the first and the second backup logical volume mirrors are synchronized at different times.

* * * * *